Dec. 4, 1945.　　　　C. E. GOSSLING　　　　2,390,144
SPEED CONTROL SYSTEM
Filed Dec. 9, 1943　　　　2 Sheets-Sheet 1
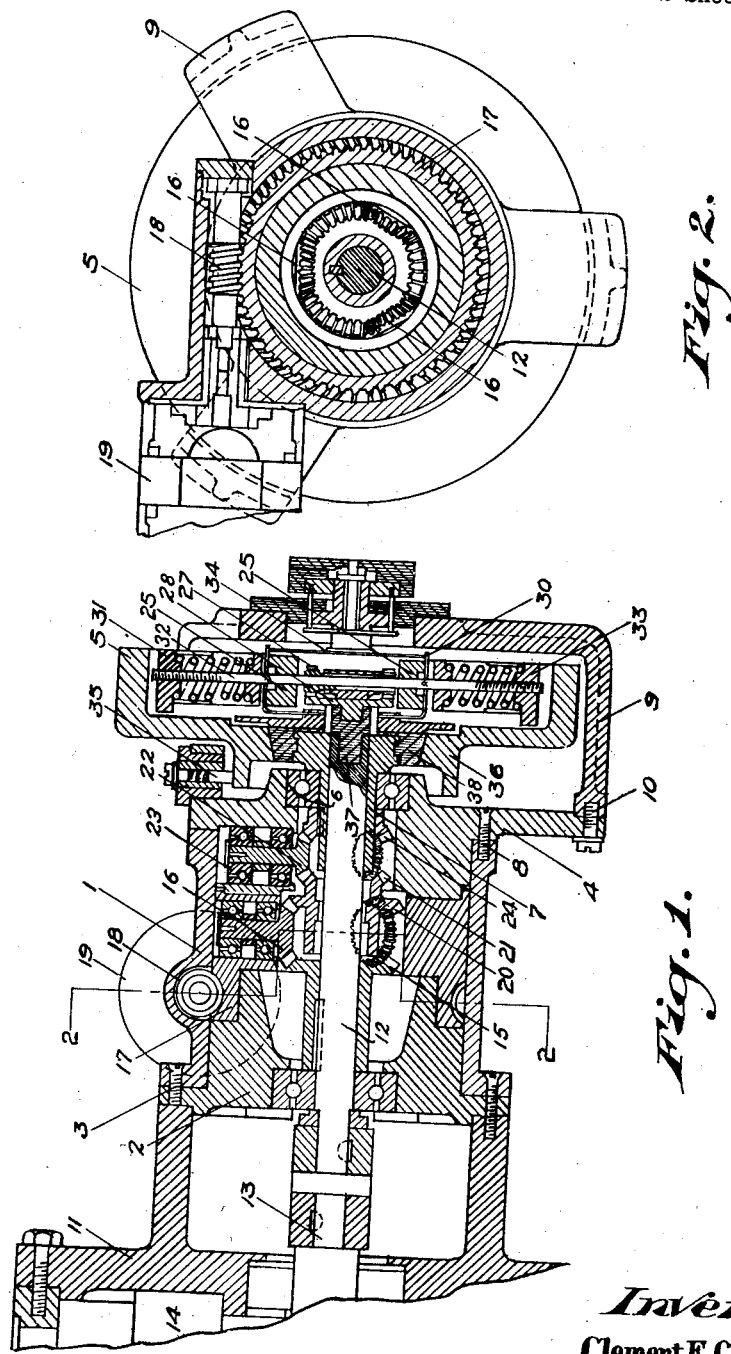
Inventor.
Clement E. Gossling.
BY Wm. J. Herdman
ATTORNEY.

Patented Dec. 4, 1945

2,390,144

UNITED STATES PATENT OFFICE 2,390,144

SPEED CONTROL SYSTEM

Clement E. Gossling, Toronto, Ontario, Canada, assignor to Rogers Majestic Corporation, Dover, Del., a corporation of Delaware Application December 9, 1943, Serial No. 513,603
In Canada February 16, 1943

9 Claims. (Cl. 264—3)

This invention relates to a speed control system suitable for regulating, for example, the speed of a motor driven machine by means of a mechanically operated, electrically controlled, centrifugal governor.

One object of my invention is to provide a simple means of varying the radius of gyration of the loading weights of a centrifugal governor to obtain a selective, uniform speed of an electrical machine while the said machine is in motion.

Another object of my invention is to provide a mechanical drive to vary the radius of gyration of the loading weights of a centrifugal governor while the machine is in motion.

A further object of my invention is to provide a means for varying and fixing as desired, the angular relationship of two concentric members, driven from the same source, while they are revolving at the same speed and capable of being set in any desired fixed angular relationship unless definitely moved.

A still further object of my invention is to provide a remote control for an electrically operated mechanical drive regulating a centrifugal governor.

Furthermore it has been my object to design the whole assembly to produce a compact, reliable, and simply constructed mechanism which will reduce manufacturing problems.

In the embodiment of this invention being described by way of example the loading weights of a standard type of centrifugal governor are housed in, and revolve with, a fly-wheel keyed to a sleeve shaft fitting over, and driven by, an extension of the armature shaft of the machine, the speed of which it is desired to control.

The loading weights are slidably mounted on a spindle and the radius of gyration of the loading weights is limited by helical compression springs located on the spindle externally to the loading weights, and held in place by nuts on the ends of the spindle. The compression of the helical springs is regulated by turning the spindle. The spring retaining nuts being threaded, one right hand and one left hand, on the opposite ends of the spindle, the amount of compression of the springs is increased or decreased as the spindle is turned either right hand or left hand.

The spindle is turned while both shafts are rotating, to adjust the spring compression against the loading weights, by means of a pinion gear keyed to the spindle, engaging a ring gear keyed to the armature shaft extension.

The sleeve shaft of the fly-wheel is driven through a planetary bevel gear train from the armature shaft extension permitting a change in the angular relationship of the two concentric shafts while they are both revolving at the same speed and at the same hand of rotation. This change in angular relationship is obtained by means of a motor driven worm gear engaging and turning an annulus in which are journalled a plurality of bevel idler pinions. A bevel gear keyed to the armature shaft extension rolling on the bevel idler pinions, journalled in the annulus, which mesh with a bevel gear revolving around the armature shaft extension, transmits the drive through a reversing planetary bevel gear train to the sleeve shaft which rotates the fly-wheel.

While the fly-wheel and loading weights carried on the spindle are revolving the rotation of the annulus will turn backward or forward the sleeve shaft, thus changing the angular relationship of the sleeve shaft and the armature shaft, causing the spindle to be turned right hand or left hand by engagement of the spindle pinion with the ring gear keyed to the armature shaft extension thus altering the spring compression against the loading weights which regulate the motor speed by operating a make and break spring contact in the electrical circuit which will hereinafter be fully explained and described.

In this type of centrifugal governor control, the motor speed is regulated by inserting or removing resistance in the shunt field circuit by means of a make and break contact in the electrical circuit which regulates the insertion or removal or resistance thus controlling the motor speed.

Referring to the drawings:

Fig. 1 is a longitudinal sectional elevation of the mechanically operated and electrically controlled centrifugal governor.

Fig. 2 is a cross section on the line 2—2, Fig. 1.

In the drawings like numerals of reference indicate correspondings parts in the different figures.

Figure 3:
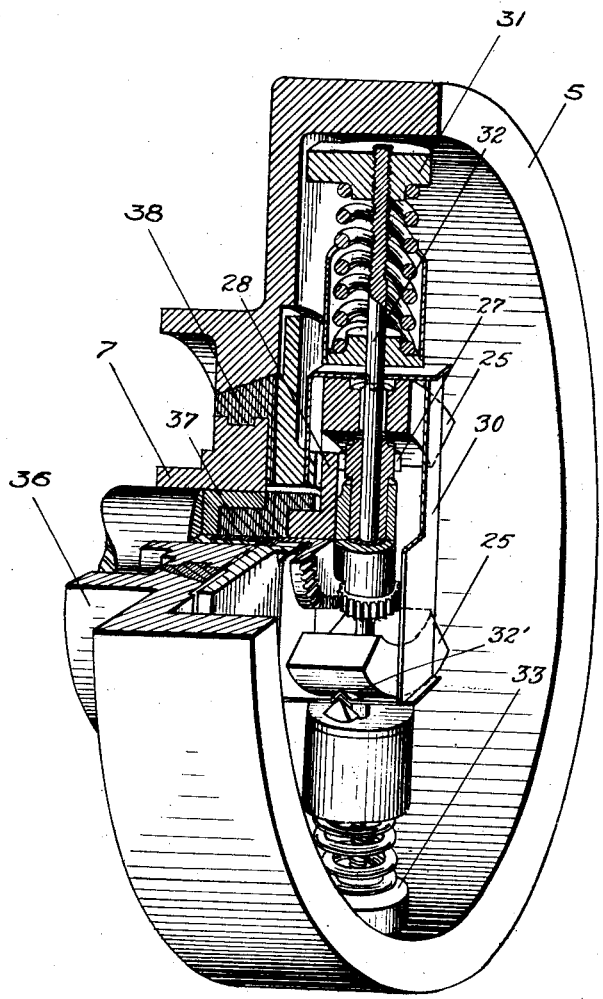
Fig. 3 is a sectional perspective view of the fly-wheel showing the loading weights and method of adjusting the weights.

The centrifugal governor shown in the accompanying drawings is enclosed in a housing constructed in four sections. Section 1 houses the planetary bevel gearing system accelerating the fly-wheel 5 and it is provided with a detachably connected end plate 2 secured in place by studs 3 to the motor housing 11. Housing section 4 forms a second end plate for housing section 1 and supports the bearing 6 for the fly-wheel sleeve shaft 7 and the bearings 23 for the reversing planetary idler bevel pinions 22. The housing section 4 is detachably secured to the housing section 1 by means of studs 8. The fly-wheel 5 is enclosed in a spider 9 detachably secured to the housing section 4 by studs 10.

Power is furnished by the motor 14 to and controlled by an extension 12 of the armature shaft 13 of the motor 14. A bevel gear 15 keyed to the shaft 12 rolls on a plurality of idler bevel pinions 16 journalled in an annulus 17. The annulus 17 is free to revolve coaxially with, and around the shaft 12 inside the housing section 1 and is rotated by means of a worm gear 18 driven by a motor 19 operated by remote control.

The drive from the bevel gear 15 is transmitted through the idler bevel pinions 16 to a bevel gear 20 which is free to revolve around the shaft 12. This bevel gear 20 has integral with it a bevel gear 21 which rolls on a plurality of idler bevel pinions 22 mounted on bearings 23 journalled in the fixed housing section 4. These idler bevel pinions 22 engage a bevel gear 24 keyed to the sleeve shaft 7 of the fly-wheel 5 and rotate the fly-wheel 5 to the same hand of rotation and at the same speed of rotation as that of the armature shaft extension 12.

Following the hand of rotation it will be obvious that if the bevel gears 15 and 20 are of uniform size and the bevel gears 21 and 24 are likewise uniform, the shaft 12 and the sleeve shaft 7 must turn in the same direction and at the same speed.

When the motor 19 is excited, the worm gear 18, directly connected with the motor 19, engaging the annulus 17, will rotate the annulus 17 thus orienting the bevel pinions 16, journalled in the annulus 17, which will roll on the bevel gear 15 thereby imparting a motion to the bevel gear 20 which through the reversing bevel gearing train 21, 22 and 24 will rotate the sleeve shaft 7 varying its angular relationship with the shaft 12. This effect will obtain either while the fly-wheel assembly is stationary or in motion. The amount of angular disposition between the shaft 12 and the sleeve shaft 7 will vary therefore according to the angle through which the annulus 17 is turned.

This change in angular relationship of the shaft 12 and the sleeve shaft 7 will turn the spindle 32, which is disposed perpendicular to the axis of rotation, by means of the ring gear 28 engaging the spindle pinion 27. Helical compression springs encircle each end of the spindle 32 and the inner bearing ends are held from rotation by the V notched member 32'. The helical spring retaining nuts 31 and 33 being threaded, one right hand and one left hand, on the ends of the spindle 32, and being restrained from turning by frictional engagement with the outer ends of the springs or by contacting the web of the fly-wheel, are, therefore, moved inward or outward on the spindle 32 as the spindle 32 is turned to the right hand or left hand, thus increasing or decreasing the spring compression against the loading weights 25 fixing a limit to the radius of gyration of the loading weights 25 and controlling the motor speed by changing the amount of resistance in the electrical circuit, in the usual manner, through a well known make and break spring contact unit in the electrical circuit, operated by the loading weights 25. The make and break spring contact member 30 makes and breaks the electrical circuit at 34. The second electrical connection being made at the brush 35 contacting the hub 36 of the fly-wheel 5.

The fly-wheel assembly is insulated from the mechanical drive assembly by means of insulation shown at 37 and 38.

It will of course be understood that while I have shown, in this embodiment, the armature shaft and the fly-wheel sleeve shaft, revolving together and driving independent portions of the same mechanism at the same speed, many variations in the gear train may be made without affecting the operation of the speed control system. Further, it will be obvious that this novel mechanism and system may be used for many other purposes requiring the angular relation of rotating members to be varied while such members are in motion, either directly or from a remote point.

I do not, therefore, desire to limit myself to the foregoing except as may be pointed out in the appended claims in which I claim and desire to secure by United States Letters Patent the following:

1. A speed control system comprising a stationary casing, a first rotating member, a secondary rotating member actuated by the said first rotating member, means for varying the angular relationship of the said first rotating member and the said secondary rotating member while both members are in motion, a centrifugal governor unit equipped with loading weights responsive to relative angular movements of said rotating members for adjusting the radius of gyration of the loading weights.

2. A speed control system comprising a stationary casing, a first rotating member, a secondary rotating member concentric with said first rotating member, a planetary reversing bevel gear train operatively connecting said first and second rotating members to relatively orient same, means for varying the angular relationship of the said first rotating member and the said secondary rotating member while both members are rotating at the same speed and in the same direction, a centrifugal governor rotated by the said secondary rotating member, having adjustably mounted loading weights and means for effecting adjustment of the radius of gyration of the loading weights operatively connected with the means for orienting the said secondary rotating member in relation to the said first rotating member.

3. A speed control system comprising a stationary casing, a first rotating member, a bevel gear keyed to the said first rotating member, a member rotatable about the axis of the first rotating member, bevel gear idler pinions journalled in said rotatable member, a secondary rotating member co-axial with the first rotating member, a planetary reversing bevel gear train meshing with the aforesaid bevel gear idler pinions and transmitting energy from the first rotating member to the secondary rotating member, means to actuate the member rotatable about the first rotating member to vary the angular relationship of said first rotating member and the said secondary rotating member through said bevel gear train, a fly-wheel keyed to the said secondary rotating member, a centrifugal governor incorporated in the fly-wheel having loading weights mounted for radial movement and means actuated by the means for varying the angular relation of the said rotating members to adjust the radius of gyration of the loading weights.

4. A speed control system comprising a stationary casing, a first rotating member, a bevel gear keyed to the said first rotating member, an annulus rotatable about the axis of the first rotating member, bevel gear pinions journalled in said annulus and meshing with said bevel gear, an idler bevel gear engaging the bevel pinions journalled in said annulus having a second bevel gear integral therewith, bevel reversing gear pinions meshing with said second bevel gear and journalled in the stationary casing, a bevel gear meshing with said reversing pinions, a secondary rotating member rotating with the latter gear the angular relationship of which may be changed in respect to the first rotating member by rotation of said annulus, a fly-wheel keyed to the said secondary rotating member, a centrifugal governor incorporated in said fly-wheel having loading weights mounted for radial movement, means for limiting the radial movement of said loading weights, and means connected with the said secondary rotating member for adjusting the radius of gyration of said loading weights.

5. A speed control system comprising a first rotating member, a bevel gear keyed to the said first rotating member engaging with bevel gear idler pinions journalled in an annulus capable of being rotated, a remote controlled, motor driven, worm gear rotating the said annulus co-axially with and around the axis of the said first rotating member inside a stationary casing, an idler bevel gear engaging the idler bevel gear pinions journalled in the said annulus having integral with it a bevel gear engaging reversing idler bevel gear pinions journalled in a stationary casing which engage a bevel gear keyed to a secondary rotating member. the angular relationship of which, to the said first rotating member, may be changed by rotation of the said annulus, a fly-wheel keyed to the said secondary rotating member, a centrifugal governor incorporated in the fly-wheel, equipped with loading weights capable of being adjusted through screw action by the orientation of the said secondary rotating member through a ring gear keyed to the said first rotating member engaging a pinion gear keyed to a screw spindle supporting the loading weights and by screw action vary the spring compression against, and limit the radius of gyration of the loading weights.

6. A speed control system comprising in combination a stationary casing, a first rotating member, a bevel gear keyed to the said first rotating member bevel gear idler pinions meshing with said bevel gear, an annulus capable of being rotated carrying said idler pinion, a motor operated by remote control, a worm gear drive actuated by the motor, rotating the said annulus coaxially with and around the axis of the said first rotating member, an idler bevel gear engaging the idler bevel gear pinions journalled in the said annulus having integral with it a bevel gear engaging reversing idler bevel gear pinions meshing with the latter bevel gear journalled in said stationary casing a bevel gear meshing with the reversing idler pinions and keyed to a secondary rotating member, the angular relationship of which, to the said first rotating member, may be changed by rotation of the said annulus, a fly-wheel keyed to the said secondary rotating member, a centrifugal governor incorporated in the fly-wheel equipped with loading weights whose radius of gyration is capable of being adjusted through screw action by the orientation of the said secondary rotating member, a ring gear keyed to said secondary rotating member, a screw spindle supporting the loading weights, gear pinions on said spindles engaging said ring gear, helical compression springs disposed externally to the loading weights and surrounding said spindle, spring retaining nuts adjustable by screw action of the spindle to vary the spring compression against, and limit the radius of gyration of the loading weights.

7. A speed control system as claimed in claim 4, in which a spindle rotatably mounted transversely to the axis of said first and second rotating members is provided with oppositely threaded ends engaging said limiting means, and gear means rotatably connecting said threaded spindle with said first rotating member to effect selective adjustment of the radius of gyration of the loading weights.

8. A speed control system as claimed in claim 1, in which the centrifugal governor unit is mounted in a fly-wheel keyed to the secondary rotating member, said fly-wheel having said radially movable loading weights, a threaded spindle rotatably mounted transversely of said secondary rotating member, compression springs mounted on the threaded ends of said spindle and engaging said loading weights to restrict their outward movement, means threaded on the ends of said spindle for regulating their compression pressure against said weights, and gear means connecting said spindle with the secondary rotating member.

9. A speed control system as claimed in claim 3, in which the member rotatable about the axis of the first rotating member and carrying bevel gear pinions is provided with a worm wheel, a worm meshing with said worm wheel, a motor operated by remote control operating said worm to rotate said second named member co-axially with and around the axis of the first rotating member and through the second rotating member adjusting the radius of gyration of the loading weights.

CLEMENT E. GOSSLING.